United States Patent

Hoeflinger

[15] 3,677,079
[45] July 18, 1972

[54] COMBINED STEADY-STATE/DYNAMIC TOTAL HEAD PROBE

[72] Inventor: Richard P. Hoeflinger, Palos Verdes Peninsula, Calif.

[73] Assignee: The United States of America as represented by the Secretary of the Air Force

[22] Filed: May 21, 1970

[21] Appl. No.: 39,350

[52] U.S. Cl. ................................. 73/147, 73/212, 73/388
[51] Int. Cl. ........................................................ G01m 9/00
[58] Field of Search ................... 73/212, 182, 147, 189, 388

[56] References Cited

UNITED STATES PATENTS 3,400,583   9/1968   Newport et al. ......................... 73/182
2,300,654   11/1942  Daiber ..................................... 73/212

*Primary Examiner*—Donald O. Woodiel
*Attorney*—Harry A. Herbert, Jr. and Arthur R. Parker

[57] ABSTRACT

A combined, coaxial probe unit including a diffused diaphragm pressure transducer sensor device positioned within a larger outer tube and mountable within a wind tunnel test model for measuring both inlet total head and static pressure. The sensor device is miniaturized and incorporates built-in protection against impact damage from contaminants in the stream flow by means of an integral baffle plate located in the tip of the probe unit immediately upstream from the sensor device.

6 Claims, 7 Drawing Figures

3,677,079
PATENTED JUL 18 1972
SHEET 1 OF 3
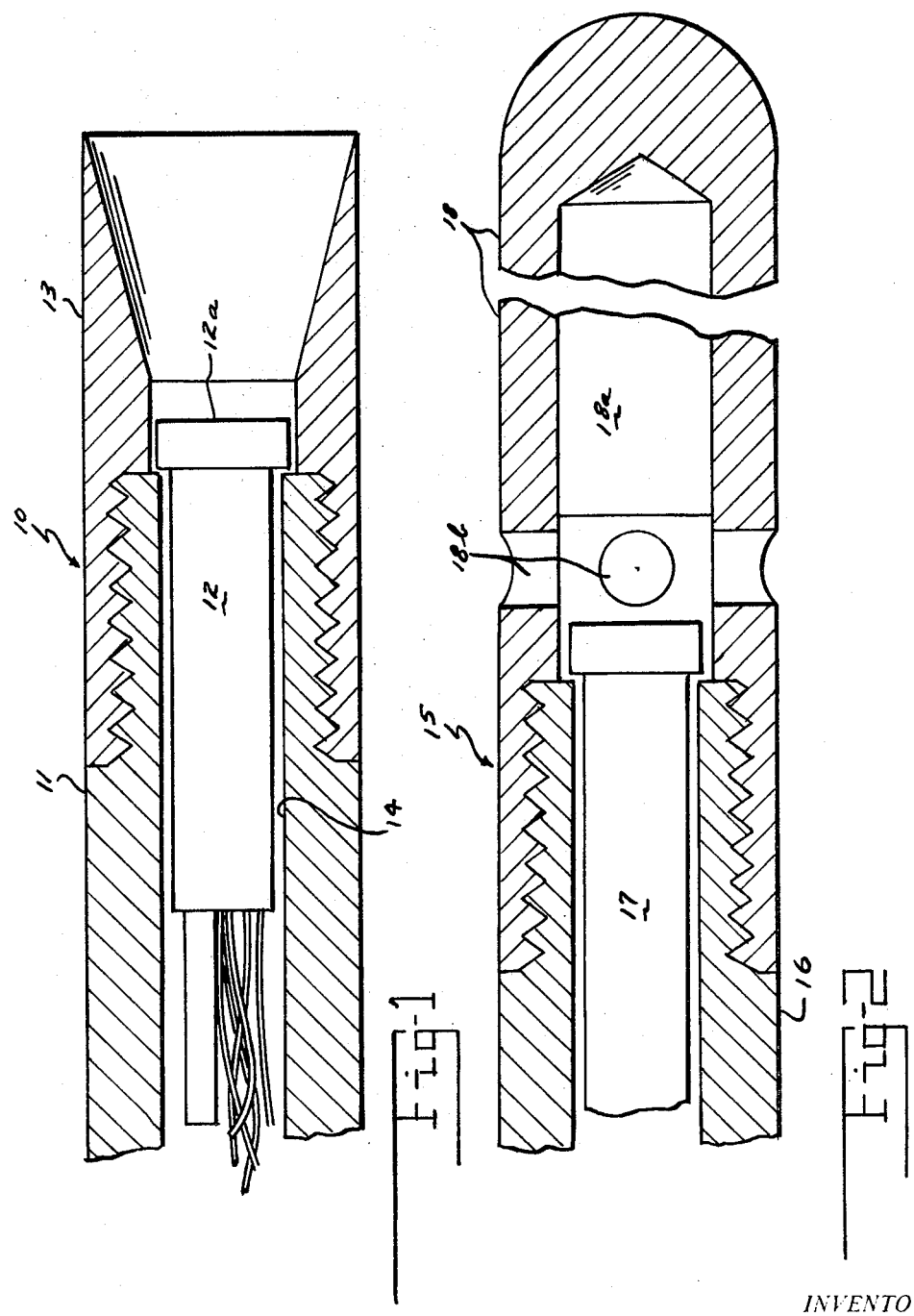
INVENTOR.
RICHARD P. HOEFLINGER
BY Harry A. Herbert Jr.
ATTORNEY
Arthur R. Parker
AGENT

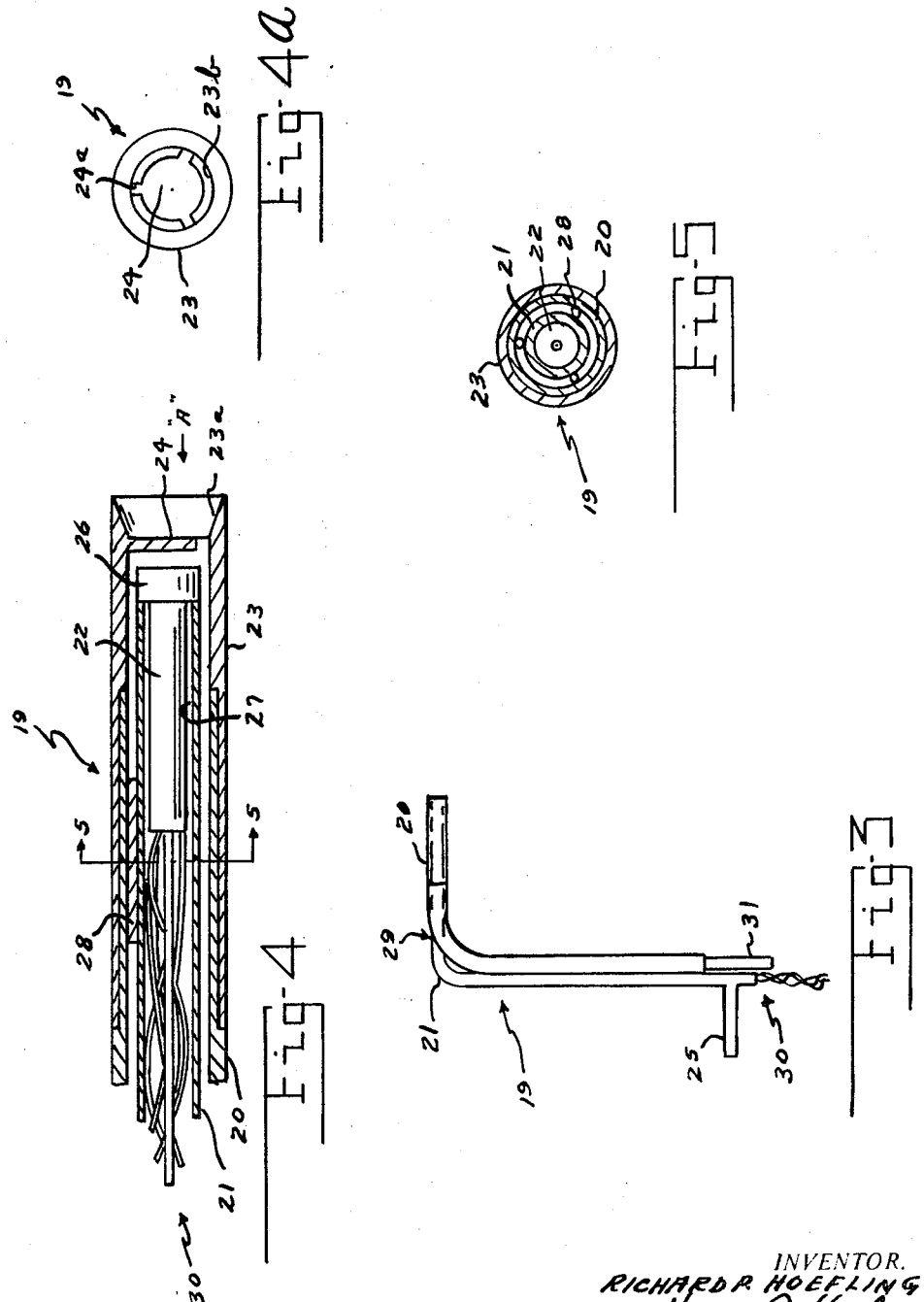

3,677,079

COMBINED STEADY-STATE/DYNAMIC TOTAL HEAD PROBE

BACKGROUND OF THE INVENTION

The present invention relates generally to the field of technology of pressure sensors used in wind tunnel tests for determining the dynamic response of supersonic air induction systems and, in particular, to the utilization of subminiature diffused diaphragm, pressure transducer sensors for the measurement of both inlet total head and static pressure.

With recent advances in the miniaturization of pressure sensors through the use of solid-state techniques, it has become possible to utilize high-response pressure transducers in wind tunnels in both quantities and applications heretofore impracticable. Thus, the availability of these extremely small pressure sensors has now provided new opportunities for the determination of the origins and effects of transient pressure phenomena. However, during certain uses of these miniaturized pressure sensors, a number of problem areas have been discovered.

In the past, commercially-available pressure transducers have been of such a size that their deployment in any but the largest wind tunnel models was severely limited. Flush diaphragm installations, considered highly desirable for transient response, have been possible for use on flat or slightly contoured surfaces but, in flow probes and rake assembles, a connecting tube has been generally required between the orifice and sensing instrument. With the advent of pressure sensors exibiting case diameters of one-eighth inch or less, it has become actually possible to locate the sensing element within the probe unit itself and, in many cases, flush-mounted diaphragms are permitted in the probe tip.

While the aforementioned flush diaphragm installations have generally been considered desirable, from the standpoint of good frequency response, the exposed diaphragm becomes vulnerable to impact damage from contaminants that may be present in the stream flow. This condition previously presented no particular problem in applications where size limitations precluded all but surface installations and the local flow was largely oriented parallel to the diaphragm surface. However, as it became possible to locate the miniaturized-type of sensor within the probes and rake assemblies, with the exposed diaphragms being oriented normal to the local stream flow, catastrophic diaphragm failures began to occur. In this connection, as a result of a test program, during which frequent diaphragm failures were observed, it became readily apparent that some method of protecting the instrument from particle impingement was required. As a result therefore, the unique and simplified diaphragm protection means of the present invention was developed.

A second major problem involved the use of separate pressure transducer-mounted probes for measuring both the steady-state and dynamic pressures. In this connection, since data recording system requirements are significantly diverse for the measurement of the so-called steady-state and dynamic (fluctuating) pressure, it had been considered appropriate to separate the two systems physically and thereby obviate such potential problem areas as signal splitting, cross-talk, and the like. However, although the use of a separate steady-state orifice coupled to a remote sensor improved measurement accuracy, it also suffered the disadvantage of reducing the steady-state/dynamic data correlation, since the individual sensing orifices are spatially separated. Therefore, it becomes highly desirable, if not absolutely essential, to locate the steady-state and dynamic probes as closely together as possible. One method of accomplishing the aforementioned location of the two sensing units in close proximity to each other is to position the two probe units in side-by-side relation. A second method involves the formation of a single concentric probe, by inserting one probe within the other, as has been uniquely accomplished in the new and improved arrangement of the present invention, which will be set forth hereinafter in the following summary and detailed description thereof.

SUMMARY OF THE INVENTION

The present invention consists briefly in a single, combined and coaxially or concentrically-arranged probe unit that includes a relatively large outer tube, and a dynamic pressure sensor, diffused diaphragm-transducer device inserted within said outer tube. Said transducer device is centered within said outer tube and an annular gap or annulus formed therebetween constitutes the steady-state sensing area. The face of the dynamic pressure sensor device is positioned in slightly recessed relation within the tube to thereby ensure internal mixing of the center core fluid with that of the annular gap or annulus. A particle deflector-metallic baffle plate is integrally formed in the probe tip immediately upstream from the transducer diaphragm to thereby protect the said diaphragm from the impact of incoming particles which may be present within the stream flow.

Other advantages, as well as objects of the present invention, will become readily apparent from the following disclosure thereof, taken in connection with the accompanying drawings, in which:

BRIEF DESCRIPTION OF THE DRAWINGS

FIGS. 1 and 2 respectfully represent sectional views, partly broken away, of a type of previously tested, separate total head and static probes to which the combined arrangement of the present invention may be applied;

FIG. 3 is a somewhat schematic and overall assembly of the combined, concentric or coaxially-arranged probe of the present invention;

FIG. 4 is a third sectional view, partly broken away, illustrating additional details of the combined probe assembly of FIG. 3;

FIG. 4a represents an end view of the probe assembly of FIG. 3, looking in the direction of the arrow "A" in FIG. 4, and showing further details of the baffle plate-protection device used in the probe tip portion;

FIG. 5 is a cross sectional view, taken about on line 5—5 of FIG. 4, and illustrating certain details of the respective mounting means between the pressure transducer-probe unit of the present invention and the outer tube thereof.

DESCRIPTION OF THE PREFERRED EMBODIMENT

Figure 6:
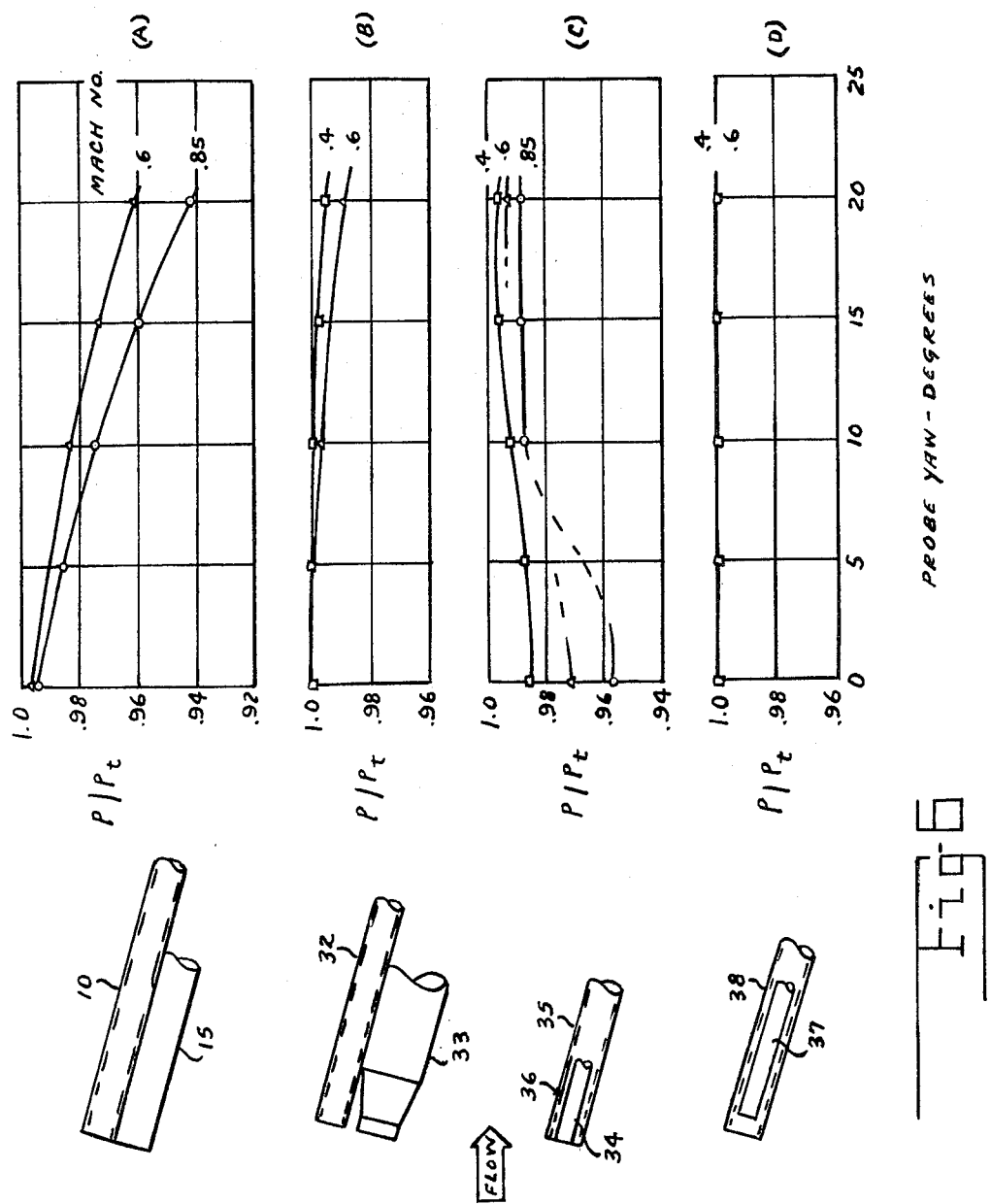
FIG. 6, (A), (B), (C), and (D) depicts a series of several different types of combined probe configurations, in schematic and partly broken-away form, and the respective performance graphs corresponding thereto.

Referring to the drawings and, in particular, to FIGS. 3 and 4 thereof, the unique and yet simplified combined probe unit of the present invention is indicated generally at 19 as including a dynamic pressure sensor-transducer device 22, shown mounted within an inner support tube at 21 which is, in turn, supported in coaxial or concentric relation within an outer tube at 20. A probe tip portion is included at 23, which probe tip portion 23 includes or incorporates a diaphragm shield or metal baffle plate at 24, which plate 24 constitutes the new and unique built-in particle-deflector means of the present invention and may be seen in a more detailed configuration thereof in FIG. 4a. As seen clearly in the latter figure, baffle plate 24 is supported to the inside of the probe tip portion 23 by means of a plurality of the interconnecting and supporting elements at 24a, leaving significant open spaces for the incoming stream flow, as indicated at 23b. The said probe tip portion 23, which also incorporates a stream-capturing cowl portion at 23a, is a one-piece construction, utilizing in part electrical discharge machining. Furthermore, said tip portion 23 is shown connected to the outer tube 20 by means of a lap joint, that may be sealed in place with soft solder and, in this manner, provide for the removal of the said probe tip portion 23 when replacement of the sensor-transducer device 22 is indicated. The annular gap between the said transducer device 22 and the outer tube 20, of course, forms the steady-state sensing area.

The aforementioned dynamic pressure sensor-transducer device 22 may consist of any suitably designed diffused diaphragm type of sensor unit, such as the Kulite transducer, which is of contemporary design and makes use of an isolated sensor network on a monolithic silicon body. In its manufacture, solid state diffusion bonding and oxide masking are used to produce a miniature, high-response pressure transducer in which the force collecting diaphragm and semiconductor strain gage sensing elements form a mechanically homogeneous wafer. Said transducer device 22 also requires a reference pressure for which a tubulation, indicated at 25 in FIG. 3, may be provided. Said transducer device 22 may also be easily modified at the factory by reducing the diameter thereof aft of the diaphragm case at 26 (FIG. 4) so as to fit into a 0.053 inch ID tube, representing the previously-noted inner support tube 21.

The above-referred to inner support tube 21 supports the said dynamic pressure sensor-transducer device 22, which may be sealed in position thereto by means of a silicone rubber adhesive material, generally indicated in the area therebetween by the reference numeral 27. A reference pressure can then be supplied to the said transducer device 22 through the said inner support tube 21 by way of the previously-noted tubulation 25. Said inner support tube 21 may be centered in the said outer tube 20 by means of a plurality of wire spacers; in this case, a total of three, as indicated at 28 in FIGS. 4 and 5. Said wire spacers may actually be composed of 0.10 inch music wire which may be silver soldered to the inner tube 21.

The aforesaid inner support tube 21 is designed to pass through the outer tube 20 at a 90° bend thereof (note FIG. 3) where it is attached and sealed, as by silver solder in the area indicated generally at the reference numeral 29. The transducer lead wires, indicated generally at 30 in FIGS. 3 and 4, are carried out of the inner support tube through a tee (not shown) and then sealed in place. Note, as an alternate configuration (not shown), the reference pressure tubulation 25 can be eliminated and this function provided by venting (not illustrated) the inner support tube 21 to the interior of the outer tube 20. In such an arrangement, the reference pressure supplied to the transducer device 22 is automatically set at the "steady-state" level. Said outer tube 20, which incorporates the steady-state annulus pressure-tubulation at 31 (FIG. 3) naturally completes the steady-state annulus, as hereinbefore noted, and further provides an attachment for the said probe tip portion 23. The termination of the said outer tube 20 may be connected to a remote sensing instrument (not shown).

Before development of the combined type of probe unit, such as is taught by that described above for the present invention (as indicated generally at 19 in FIG. 4, for example), separate total head and static probes of a larger type, such as indicated respectively at 10 and 15 in FIGS. 1 and 2 were examined. Total head probe 10 in FIG. 1, for example, included a total head-probe support tube 11, a pressure sensor, as for example, a Kulite-type of transducer, as at 12, and a screw-on cap at 13. Said transducer 12 includes, as noted hereinbefore, a diaphragm case portion at 12a which naturally supports therewithin a flush-type diaphragm. An adhesive sealant may be used in the area between transducer 12 and tube 11, as indicated generally at the reference numeral 14.

The aforementioned static probe 15 (FIG. 2), likewise consists of an outer probe support tube 16; a pressure sensor-transducer at 17 supported within said outer probe tube 16, and a screw-on cap 18 having a filled cavity 18a and a plurality of openings at 18b. As clearly seen, the transducer mounting for both probes 10 and 15 is identical, except for the screw-on caps 13, 18. On the total head probe 10, cap 13 serves two purposes; namely, it is designed with a 15° inner chamfer to minimize the yaw sensitivity of the probe, and it forms some sort of protective covering for the exposed diaphragm, during the handling and installation thereof. However, during a wind tunnel test thereof involving several instruments, virtually all the total head probes, such as at 10, were out of service within a few minutes because of damage to the diaphragms of the pressure sensor-transducer, such as that at 12, whereas, the static probe transducers, such as at 15 (FIG. 2) survived intact, because of their non-exposure to the direct stream flow.

The above-referred to failure of the diaphragm in the separate total head probes, as at 10 in FIG. 1, led to the development of the previously-described unique baffle plate-particle deflector means of the present invention, as illustrated at 24 in FIG. 4, for example. Initially, the aforementioned screw-on probe cap, as at 13 (FIG. 1) was modified to incorporate both screen elements and solid baffle plates as a protecting means for the transducer diaphragm. The screen elements, though providing adequate protection during some tests, subsequently proved inferior to the metal baffle plate arrangement, such as has been previously-described hereinbefore at the reference numeral 24 for the present invention.

In addition to the requirement for the protective baffle plate 24, the present invention further involves the use of a combined concentric or coaxially arranged probe unit, as has been previously described at the reference numeral 19 in FIGS. 3 and 4, for example. This combined feature, whereby both total head and static pressure measurement is incorporated in one coaxial probe unit, as at 19, was necessitated by the previous determination that it is desirable to locate both the steady-state and dynamic probes as closely together as possible in order to achieve reasonable steady-state/dynamic data correlation. To this end, the said two separate probes (10, 15 of FIGS. 1 and 2 for example) may be assembled in side-by-side relation in the manner shown, for example, in FIG. 6, (A). In the graph of FIG. 6, (A), wind tunnel data for this type of side-by-side configuration was obtained by yawing the probes 10, 15 through the angle range shown, and the indicated steady-state pressure therefor was recorded. It is noted that the configurations illustrated are representative of a ⅛-inch flush-mounted dynamic sensor and a 3/32-inch OD steady-state tube. As seen in the aforesaid graph of FIG. 6, (A), by locating the steady-state orifice of the probe 10 in close proximity to the orifice of the dynamic sensor-probe 15, an adverse effect on the steady-state pressure is obtained, with the indicated value being found less than the actual value even at zero incidence. The performance is shown as deteriorating rapidly with increasing yaw angle. Separating the two probes in the manner shown at 32 and 33 for the second side-by-side configuration of FIG. 6, (B), only a slight amount, results in a marked performance gain, as indicated in the second graph corresponding to FIG. 6, (B).

The single, combined coaxial or concentrically-arranged type of probe unit, similar to that of the present invention, and consisting of two slightly modified forms thereof, is illustrated respectively in FIGS. 6, (C) and (D). In FIG. 6, (C), for example, a miniature pressure transducer at 34, having a screen-type protection for its diaphragm (not shown) is inserted or supported within the interior of a larger tube 35. Naturally, the annular gap between the transducer 34 and the tube 35 comprises the steady-state sensing area. Static performance data obtained for this configuration is presented in the graph corresponding to FIG. 6, (C). The relatively poor performance indicated thereby was considered due to the location of the centerbody of the transducer 34, which precluded transmittal of the high-pressure center core fluid to the probe interior. Thus, the exposed annulus, indicated generally at 36, was capable of sensing only the pressure distributed on the probe face outer periphery, which was reduced in magnitude due to edge effects. On the other hand, by slightly recessing the dynamic sensor-transducer, as illustrated for the transducer at 37 in FIG. 6, (D), which is representative of the unique single, combined probe of the present invention, within the outer tube 38, internal mixing of the center core fluid with that of the annulus may be assured, resulting in the ideal steady-state performance shown in the graph corresponding to the said FIG. 6, (D).

Thus, a new and improved miniaturized probe has been developed which exhibits relatively good dynamic response, acceptable steady-state performance, ensures a minimum frontal blockage area to flow, provides direct correlation between both steady-state and dynamic pressure-sensing orifices due to their location at essentially the same spatial coordinates, and uniquely incorporates a built-in shield against direct particle impact on the pressure transducer diaphragm.

I claim:

1. A combined, high-response probe instrument for measuring pressure during wind tunnel tests, comprising; a first, relatively large, outer support means; a second, relatively small, inner, dynamic pressure-sensing means positioned within said outer support means and having a relatively sensitive, flow-receiving face portion exposed to the direct stream flow; said second, dynamic pressure-sensing means being centered within, and oriented in spaced relation to, said outer support means to thereby form an annular gap or annulus therebetween constituting a steady-state pressure-sensing means; and an open probe tip portion formed with said first, outer support means and thereby directing the wind tunnel stream flow into the probe instrument; said second, dynamic pressure-sensing means comprising a pressure transducer device.

2. A combined, high-response probe instrument as in claim 5, wherein said pressure transducer device is positioned with the flow-receiving face portion thereof oriented in a relatively slight recessed relation relative to the upstream end of said first, outer support means to thereby ensure more efficient internal mixing between the center core fluid with the steady-state fluid within the annular gap formed between said outer support means and said pressure transducer device.

3. A combined, high-response probe instrument as in claim 1, wherein said sensitive, flow-receiving face portion comprises a diffused diaphragm incorporated in the upstream portion of said pressure transducer device.

4. A combined, high-response probe instrument as in claim 7, wherein said probe tip portion incorporates particle-deflector means immediately upstream of, and thereby protecting the said diffused diaphragm from particle-impact damage from contaminants in the stream flow.

5. A combined, high-response probe instrument as in claim 8, wherein said particle-deflector means comprises a metal baffle plate.

6. A combined, high-response probe instrument as in claim 9, wherein said metal baffle plate incorporates a plurality of relatively elongated, cut-out opening portions adjacent the circumference thereof to thereby minimize the obstruction thereof to the incoming stream flow.

* * * * *